(12) United States Patent
Gordon et al.

(10) Patent No.: US 10,101,631 B2
(45) Date of Patent: Oct. 16, 2018

(54) LIQUID CRYSTAL LENS WITH VARIABLE FOCAL LENGTH

(71) Applicant: International Business Machines Corporation, Armonk, NY (US)

(72) Inventors: Michael S. Gordon, Yorktown Heights, NY (US); John U. Knickerbocker, Monroe, NY (US); Minhua Lu, Mohegan Lake, NY (US); Robert Polastre, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/239,972

(22) Filed: Aug. 18, 2016

(65) Prior Publication Data

US 2018/0052377 A1    Feb. 22, 2018

(51) Int. Cl.
| | |
|---|---|
| *G02F 1/29* | (2006.01) |
| *G02F 1/1343* | (2006.01) |
| *G02B 3/12* | (2006.01) |
| *G02F 1/137* | (2006.01) |

(52) U.S. Cl.
CPC ............... *G02F 1/29* (2013.01); *G02B 3/12* (2013.01); *G02F 1/137* (2013.01); *G02F 1/13439* (2013.01)

(58) Field of Classification Search
CPC ........ G02F 1/29; G02F 1/13439; G02F 1/137; G02B 3/12
See application file for complete search history.

(56) References Cited

U.S. PATENT DOCUMENTS

| | | | | |
|---|---|---|---|---|
| 4,919,520 | A * | 4/1990 | Okada | G02B 3/14 349/13 |
| 2012/0019761 | A1* | 1/2012 | Nystrom | G02F 1/133351 349/139 |
| 2015/0029424 | A1* | 1/2015 | Gordon | G02C 7/083 349/13 |
| 2015/0077659 | A1* | 3/2015 | Pugh | G02F 1/133371 349/13 |

OTHER PUBLICATIONS

"Liquid-Crystal Lens-Cell with Variable Focal Length", Susumo Sato, Japanese Journal of Applied Physics, vol. 18, No. 9, Sep. 1979, 2 pgs.

* cited by examiner

*Primary Examiner* — Kevin Quarterman
(74) *Attorney, Agent, or Firm* — Harrington & Smith; Louis J. Purcello

(57) ABSTRACT

A lens structure includes a transparent cell containing a liquid crystal material. The cell is thicker in a center region thereof than at peripheral regions. The structure further includes transparent electrically conductive electrodes coupled with opposing top and bottom surfaces of the cell and configured to establish an electric field through the cell that is strongest at the peripheral regions where the cell is thinner relative to the center region so that a value of the index of refraction of the liquid crystal material changes across the cell from the center region towards the peripheral regions to change an effective focal length of the lens structure. In some embodiments the top surface of the cell has a first curvature $C_1$ and the bottom surface of the cell has a second curvature $C_2$ that differs from the first curvature.

14 Claims, 8 Drawing Sheets

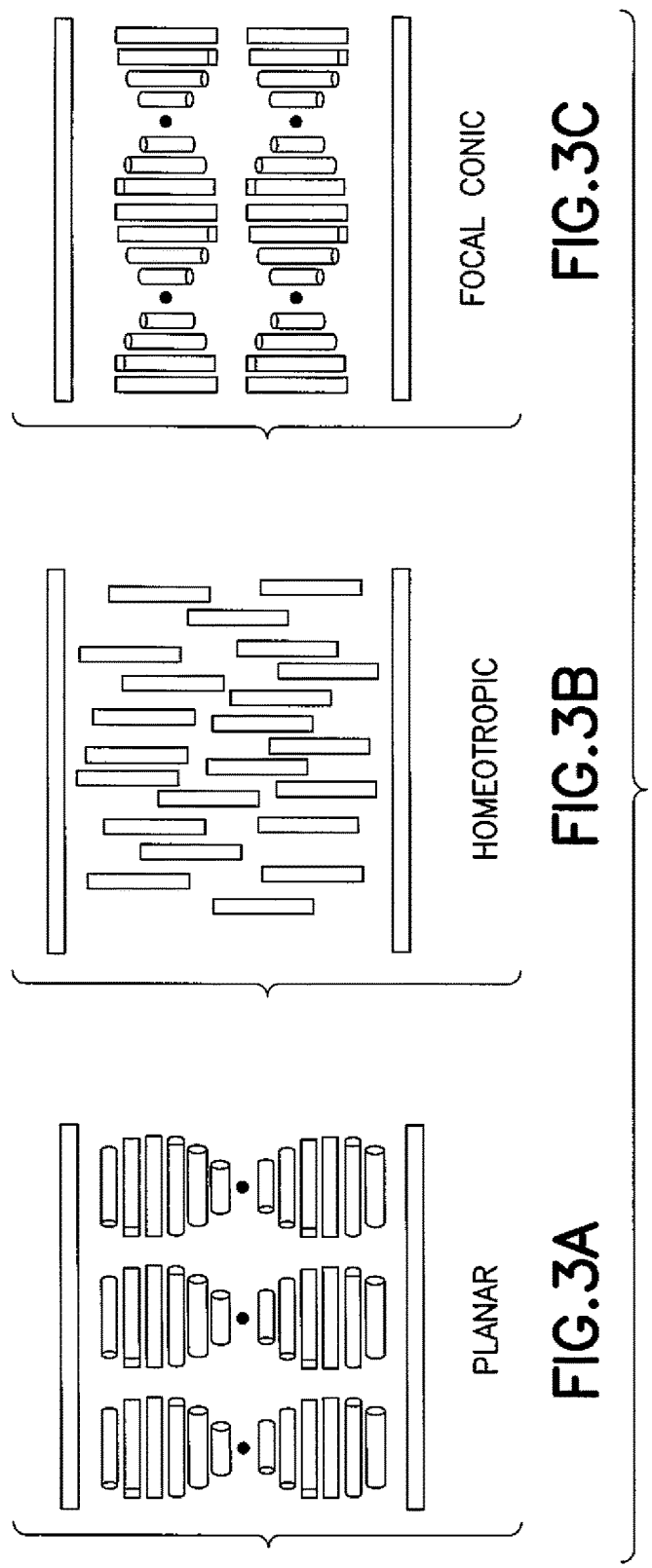

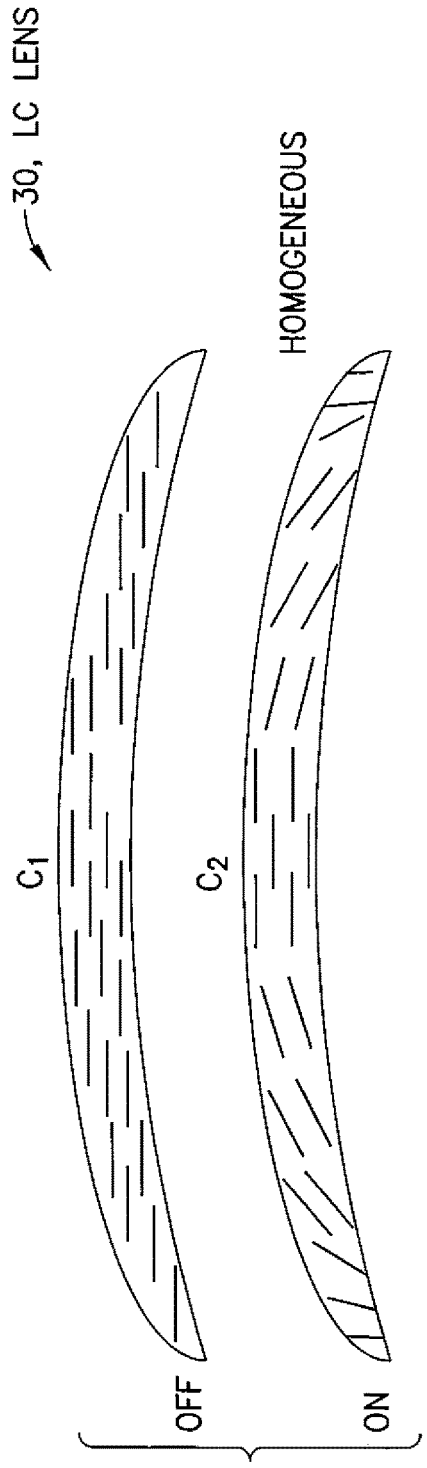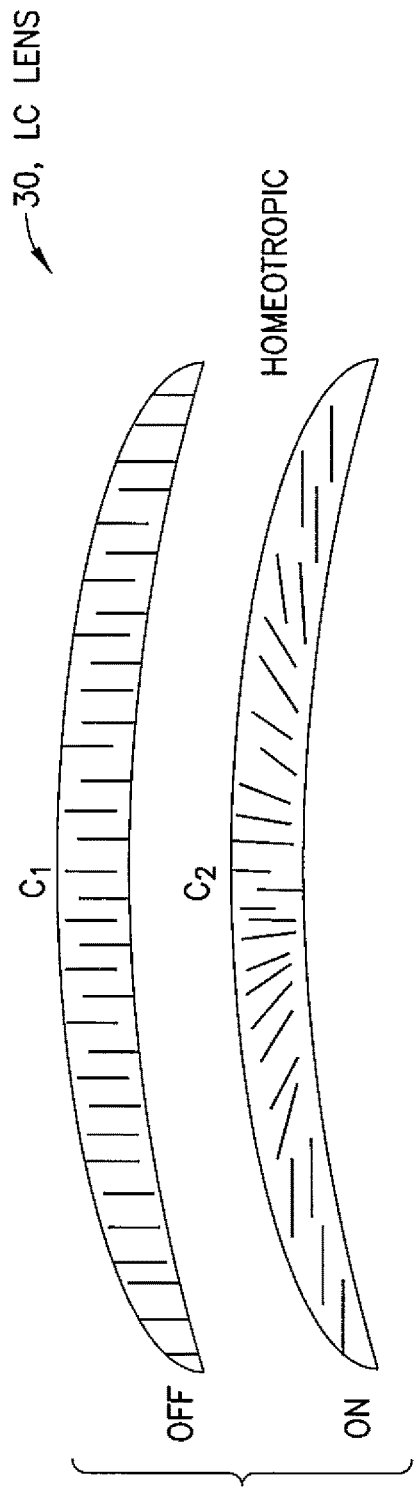
FIG.5A
FIG.5B

LIQUID CRYSTAL LENS WITH VARIABLE FOCAL LENGTH

TECHNICAL FIELD

The exemplary embodiments of this invention relate generally to optical devices and methods and, more specifically, relate to lens elements that include liquid crystal (LC) material.

BACKGROUND

Liquid crystal lenses have been considered as a potential candidate to replace or simplify conventional optics. Advantages of liquid crystal lenses, which can be electronically controlled, include tunable power, small size, low cost, low power consumption and high switching speeds.

SUMMARY

In a first exemplary embodiment the invention provides a lens structure that comprises a transparent cell containing a liquid crystal material, where the cell is thicker in a center region thereof than at peripheral regions; and transparent electrically conductive electrodes coupled with opposing top and bottom surfaces of the cell and configured to establish an electric field through the cell that is strongest at the peripheral regions where the cell is thinner relative to the center region so that a value of the index of refraction of the liquid crystal material changes across the cell from the center region towards the peripheral regions to change an effective focal length of the lens structure.

In another exemplary embodiment the invention provides a method that comprises providing a structure comprised of a transparent cell containing a liquid crystal material, the cell being thicker in a center region thereof than at peripheral regions and transparent electrically conductive electrodes coupled with opposing top and bottom surfaces of the cell and configured to establish an electric field through the cell that is strongest at the peripheral regions where the cell is thinner relative to the center region so that a value of the index of refraction of the liquid crystal material changes across the cell from the center region towards the peripheral regions to change an effective focal length of the structure; and applying a voltage potential to the transparent electrically conductive electrodes to establish the electric field only in the peripheral regions of the cell to cause the liquid crystal material in the peripheral regions of the cell to exhibit one of a planar liquid crystal mode, a homeotropic liquid crystal mode and a focal conic liquid crystal mode.

In yet another exemplary embodiment the invention provides a method that comprises providing a structure comprised of a transparent cell containing a liquid crystal material, the cell being thicker in a center region thereof than at peripheral regions and transparent electrically conductive electrodes coupled with opposing top and bottom surfaces of the cell and configured to establish an electric field through the cell that is strongest at the center region where the cell is thicker relative to the peripheral regions so that a value of the index of refraction of the liquid crystal material changes across the cell from the center region towards the peripheral regions to change an effective focal length of the structure; and applying a voltage potential to the transparent electrically conductive electrodes to establish the electric field only in the central region of the cell to cause the liquid crystal material in the central region of the cell to exhibit one of a planar liquid crystal mode, a homeotropic liquid crystal mode and a focal conic liquid crystal mode.

BRIEF DESCRIPTION OF THE SEVERAL VIEWS OF THE DRAWINGS

FIGS. 3A, 3B and 3C, collectively referred to as FIG. 3, illustrate a planar cholesteric liquid crystal mode, a homeotropic cholesteric liquid crystal mode and a focal conic cholesteric liquid crystal mode, respectively.

FIG. 5A (homogeneous case) and FIG. 5B (homeotropic case), collectively referred to as FIG. 5, illustrate embodiments of a liquid crystal lens that utilizes a cell gap variation to change the focal length.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As considered herein a structure such as a cell can be considered to be 'transparent' if it passes through the structure all or substantially all light having a wavelength or a range of wavelengths of interest.

Figure 1:
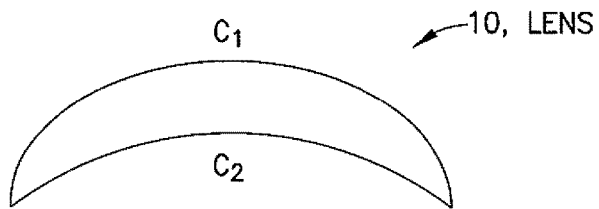
FIG. 1 is an enlarged cross-section view of a liquid crystal (LC) lens in accordance with an aspect of this invention.

Referring to FIG. 1, the focal length (f) of a thin lens 10 is given by:

$$\frac{1}{f} = (n-1)(C_1 - C_2),$$

where n is the refractive index of the lens and C is the curvature of the lens surface. The focal length can be adjusted by either changing the lens curvature or by changing the refractive index.

To change the curvature of the lens, assume as a non-limiting example a case where n=1.35, $C_1$=115 l/m (r=8.7 mm), $C_2$=133 l/m (r=7.5 mm). For a 3 diopter change in focal length, a curvature change of 8.5 $m^{-1}$ is required, i.e.:

$$\Delta \frac{1}{f} = (n-1)\Delta C_1$$

$$\Delta C1 = \Delta \frac{1}{f} \bigg/ (n-1) \approx 8.5 \text{ m}^{-1}$$

For the case of a LC lens, assume that the curvature of the lens is constant. For an exemplary index of refraction change $\Delta n$=0.25 the lens can readily satisfy the 3 diopter optical power change. The larger the curvature difference that exists between the two major surfaces of the lens, e.g., assume that one surface of the lens is nearly flat, the larger will be optical power change. For the same lens geometry as the above example, $C_1$=115 l/m (r=8.7 mm), $C_2$=133 l/m (r=7.5 mm), the focal length change with a liquid crystal of 0.25 birefringence can be as large as 4.5 diopter:

$$\Delta \frac{1}{f} = \Delta n(C_1 - C_2) = 0.25 * 18 = 4.5.$$

Figure 2:
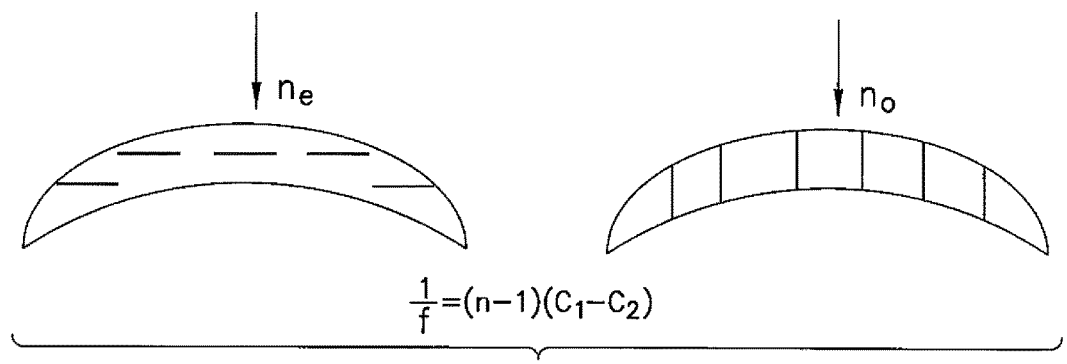
FIG. 2 illustrates the lens of FIG. 1 and is useful when explaining how it is possible to utilize birefringence to vary the focal length of the LC lens with a large tunable range of focal length.

Referring to FIG. 2, it is possible to utilize birefringence to vary the focal length of the LC lens with a large tunable range of focal length. The lens can be polarization independent (no polarizer) and can exhibit azimuthal symmetry with no or little polar angle dependence. The LC lens can exhibit bistable or multistable operation, with no field required to maintain the state and thus consumes little power. The default state of the LC lens can be either a longer or a shorter focal length. The LC lens can require a low operation voltage (e.g., <5V to about 10V) depending on the lens thickness). In general the tunable range of the focal length depends on the birefringence and lens curvature differences—the larger the birefringence, the larger will be the tunable range, where $\Delta n$ is 0.1 or greater, preferably 0.2 or greater.

FIG. 3 shows examples of cholesteric liquid crystal modes. A cholesteric liquid crystal contains chiral molecules such that the director of the molecules undergoes a helical distortion. With regard to the cholesteric pitch, in the infrared (IR) range (e.g., 1-2 µm), the lens is transparent to visible light yet with several full pitch LC layers it can exhibit a uniform angular distribution of refractive index. Further in regard to the cholesteric pitch, in the ultraviolet (UV) range the lens is transparent to visible light but can reflect harmful UV light (with a the use of a higher switching voltage).

Referring to FIG. 3A, a State 1 cholesteric liquid crystal mode can be a planar state with n=$n_e$~1.7. If using homogeneous alignment this is the off (default) state and a shorter focal length can be achieved. Referring to FIG. 3B, a State 2 cholesteric liquid crystal mode can be a homeotropic state with n=$n_o$~1.5 and a longer focal length can be achieved. This is the on state for homogenous alignment. It should be noted that the effective focal length of the lens can be either positive (convex) or negative (concave) depending on the curvatures of the front and back lens surface. Referring to FIG. 3C, a State 3 cholesteric liquid crystal mode can be a focal conic (intermediate) state where n has a value between the planar state and the homeotropic state.

In general, a cholesteric liquid crystal composition layer comprises one or more layers of a cholesteric liquid crystal composition. The term "cholesteric liquid crystal composition" refers to a composition including, but not limited to, a cholesteric liquid crystal compound, a cholesteric liquid crystal polymer or a cholesteric liquid crystal precursor such as, for example, lower molecular weight cholesteric liquid crystal compounds including monomers and oligomers that can be reacted to form a cholesteric liquid crystal polymer.

Cholesteric liquid crystal compounds include molecular units that are chiral in nature (e.g., molecules that do not possess a mirror plane) and molecular units that are mesogenic in nature (e.g., molecules that exhibit liquid crystal phases) and can be polymers. The cholesteric liquid crystal compounds may comprise achiral liquid crystal compounds (nematic) mixed with or containing a chiral unit. Cholesteric liquid crystal compounds include compounds having a cholesteric liquid crystal phase in which the liquid crystal director of the liquid crystal rotates in a helical fashion along the dimension perpendicular to the director.

The pitch of a cholesteric liquid crystal composition is the distance (in a direction perpendicular to the liquid crystal director and along the axis of the cholesteric helix) that it takes for the liquid crystal director to rotate through 360°. The pitch of a cholesteric liquid crystal composition can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the liquid crystal director results in a spatially periodic variation in the dielectric tensor of the material, which in turn gives rise to the wavelength selective reflection of light. For light propagating along the helical axis, Bragg reflection generally occurs when the wavelength, λ, is in the following range, $n_o p < \lambda < n_e p$, where p is the pitch and $n_o$ and $n_e$ are the principal refractive indices of the cholesteric liquid crystal composition. For example, the pitch can be selected such that the Bragg reflection is peaked in the visible, ultraviolet, or infrared wavelength regimes of light.

Cholesteric liquid crystal compounds, including cholesteric liquid crystal polymers, are generally known and typically any of these materials can be used in a cholesteric liquid crystal composition. Suitable cholesteric liquid crystal compounds may be selected for a particular application based on one or more factors including, for example, refractive indices, surface energy, pitch, process-ability, clarity, color, low absorption in the wavelength of interest, compatibility with other components (e.g., a nematic liquid crystal compound), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

Cholesteric liquid crystal polymers are generally formed using chiral (or a mixture of chiral and achiral) molecules (including monomers) that can include a mesogenic group (e.g., a rigid group that typically has a rod-like structure to facilitate formation of a liquid crystal phase). Mesogenic groups include, for example, para-substituted cyclic groups (e.g., para-substituted benzene rings). The mesogenic groups are optionally bonded to a polymer backbone through a spacer. The spacer can contain functional groups having, for example, benzene, pyridine, pyrimidine, alkyne, ester, alkylene, alkene, ether, thioether, thioester, and amide functionalities. The length or type of spacer can be altered to provide different properties such as, for example, solubilities in solvent(s).

Examples of cholesteric liquid crystal polymers include polymers having a chiral or achiral polyester, polycarbonate, polyamide, polyacrylate, polymethacrylate, polysiloxane, or polyesterimide backbone that include mesogenic groups optionally separated by rigid or flexible co-monomers. Other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups are optionally separated from the backbone by a spacer, such as, for example, an alkylene or alkylene oxide spacer, to provide flexibility.

As was discussed above with respect to FIGS. 3A-3C, cholesteric liquid crystal compounds generally exhibit three states. In the first, the cholesteric helical axis is oriented normal to the tangent plane of the substrate layers of the adjustable focal length lens. This is known as the planar state (FIG. 3A). The planar state will reflect light by the Bragg effect as explained above. Thus, the planar state may appear colored and reflective or, if the pitch is in the infrared, transparent. Another state is achieved by the application of an electric field sufficient to disrupt the planar state into the disordered, focal conic state (FIG. 3C). Depending on the nature of the cholesteric composition and the pitch of the cholesteric composition, the focal conic state may be weakly or strongly light scattering. At higher voltages, the pitch is completely unwound and the cholesteric molecules become oriented perpendicular to the tangent plane of the substrate layers of the adjustable focal length lens. This is known as the homeotropic state shown in FIG. 3B, which is transparent. In pure cholesteric materials, the planar state is stable, the homeotropic state is unstable and the focal conic state is metastable, taking from seconds to hours to revert to the planar state upon removal of an electric field. By stabilizing the appropriate cholesteric state with a polymer network, the focal conic-planar transition time may be greatly reduced. Alternatively, the focal conic state can be stabilized such that it reverts to the planar state only if first switched to the homeotropic state, allowing bistable liquid crystal to be made.

The following are specific example embodiments of cholesteric liquid crystal composition materials. It is understood that the following examples are not exclusive and that there may be any number of other examples suitable for use in adjustable focal length lens that are an aspect of this invention.

In one embodiment a selected cholesteric liquid crystal composition can comprise a cholesteric liquid crystal composition with a pitch in the infrared wavelength range, about 1-2 μm to about 5-10 μm, such that the adjustable focal length lens (e.g., the lens 30 shown in FIG. 5) is transparent to visible light. In this embodiment, cholesteric liquid crystal composition layer comprises at least a ½ pitch cholesteric liquid crystal composition layer to several full pitch cholesteric liquid crystal composition layers in order to have uniform angular distribution of the index of refraction. In this exemplary embodiment the cholesteric liquid crystal compounds of the cholesteric liquid crystal composition are aligned parallel to the tangent plane of the enclosing cell substrate surfaces. This alignment allows the planar state with an index of refraction $n=n_e$ of about. 1.7 to be the default state when no voltage is applied. The homeotropic state with an index of refraction of $n=n_o$ about 1.5 is the "on state" when a voltage is applied. The focal conic state is an intermediate state. In this embodiment, the voltage needed to switch from the planar state to the homeotropic state is about 2-10 volts depending on thickness and the liquid crystal properties. In this embodiment, the thickness of cholesteric liquid crystal composition layer can be about 2 μm to about 10 μm in that part of the lens 30 where switching is desired.

In another embodiment, the cholesteric liquid crystal composition can have a pitch in the UV wavelength range, about 100 nm to about 310 nm, such that the adjustable focal length lens (e.g., the lens 30 shown in FIG. 5) is transparent to visible light but UV light is reflected. In this embodiment the cholesteric liquid crystal composition comprises at least a ½ pitch cholesteric liquid crystal composition layer to several full pitch cholesteric liquid crystal composition layers in order to have uniform angular distribution of the index of refraction. In this embodiment, the cholesteric liquid crystal compounds of the cholesteric liquid crystal composition are aligned parallel to the tangent plane of cell substrate surfaces. This alignment allows the planar state with an index of refraction $n=n_e$ of about. 1.7 to be the default state when no voltage is applied. The homeotropic state with an index of refraction of $n=n_o$ of about. 1.5 is the "on state" when a voltage is applied. The focal conic state is an intermediate state. In this embodiment, the voltage needed to switch from the planar state to the homeotropic state is about 5 volts to about 20 volts depending on the thickness and the liquid crystal properties. In this embodiment, the thickness of cholesteric liquid crystal composition layer can be about 2 μm to about 10 μm in that part of the lens 30 where switching is desired.

In yet another embodiment the cholesteric liquid crystal composition material comprises a bistable cholesteric liquid crystal composition with a pitch in the infrared wavelength range, about 1-2 μm to 5-10 μm, such that adjustable focal length lens (e.g., the lens 30 shown in FIG. 5) is transparent to visible light. In this embodiment the cholesteric liquid crystal composition layer comprises at least a ½ pitch cholesteric liquid crystal composition layer to several full pitch cholesteric liquid crystal composition layers in order to have uniform angular distribution of the index of refraction. In this embodiment, the cholesteric liquid crystal compounds of the cholesteric liquid crystal composition are aligned parallel to the tangent plane of the cell substrate surfaces. This alignment allows the planar state with an index of refraction $n=n_e$ of about 1.7 to be the default state when no voltage is applied. The homeotropic state with an index of refraction of $n=n_o$ of about 1.5 can be polymer stabilized such that when the appropriate switching voltage is applied the bistable cholesteric liquid crystal composition will switch to the homeotropic state and stay in that state even when the voltage is removed. The focal conic state is an intermediate state. In this embodiment, the voltage needed to switch from the planar state to the homeotropic state is about 2 volts to about 20 volts depending on thickness and the liquid crystal properties. In this embodiment the thickness of cholesteric liquid crystal composition layer can be about 5 μm to about 10 μm in that part of the lens 30 where switching is desired.

Polymer stabilization can be accomplished in several ways. Polymer networks can be formed during the initial stages of cholesteric liquid crystal composition preparation by combining a small quantity of reactive monomer, a photoinitiator with cholesteric liquid crystal molecules, and a small amount of chiral dopant to produce the desired pitch. After the desired alignment (or texture) is established through the combination of surface preparations and applied field, ultraviolet light may be used to photopolymerize the cholesteric liquid crystal composition. Photoinitiators can be activated by electromagnetic radiation or particle irradiation. Examples of suitable photoinitiators include, onium salt photoinitiators, organometallic photoinitiators, metal salt cationic photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources can be used. Photoinitiators can be chosen based on the absorption of particular wavelengths of light.

In yet another embodiment the cholesteric liquid crystal composition comprises a bistable cholesteric liquid crystal composition with a pitch in the infrared wavelength range, about 1-2 µm to 5-10 µm, such that adjustable focal length lens (e.g., the lens 30 shown in FIG. 5) is transparent to visible light. In this embodiment the cholesteric liquid crystal composition comprises at least a ½ pitch cholesteric liquid crystal composition layer to several full pitch cholesteric liquid crystal composition layers in order to have uniform angular distribution of the index of refraction. In this embodiment, the cholesteric liquid crystal compounds of the cholesteric liquid crystal composition are aligned perpendicular to the tangent plane of cell substrate surfaces. This alignment allows the homeotropic state with an index of refraction of n=$n_o$ of about 1.5 to be the default state when no voltage is applied. In this embodiment, the dielectric anisotropy of the liquid crystal material is negative. This type of liquid crystal material will rotate to the direction perpendicular to the electric field direction when voltage is applied. The planar state with an index of refraction n=$n_e$ of about 1.7 is the "on state" when a voltage is applied. The focal conic state is an intermediate state. In this embodiment, the voltage needed to switch from the homeotropic state to the planar state is about 2-20 volts depending on thickness and the liquid crystal properties. In this embodiment the thickness of the cholesteric liquid crystal composition layer can be about 5 µm to about 10 µm in that part of the lens 30 where switching is desired.

In one embodiment a selected cholesteric liquid crystal composition can comprise a cholesteric liquid crystal composition with a pitch in the infrared wavelength range, about 1-2 µm to 5-10 µm, such that the adjustable focal length lens (e.g., the lens 30 shown in FIG. 5) is transparent to visible light. In this embodiment, cholesteric liquid crystal composition layer comprises at least a ½ pitch cholesteric liquid crystal composition layer to several full pitch cholesteric liquid crystal composition layers in order to have uniform angular distribution of the index of refraction. In this exemplary embodiment the cholesteric liquid crystal compounds of the cholesteric liquid crystal composition are aligned perpendicular to the tangent plane of the enclosing cell substrate surfaces. This alignment allows the homeotropic state with an index of refraction n=$n_o$ of about. 1.5 to be the default state when no voltage is applied. The planer state with an index of refraction of n=$n_e$ about 1.7 is the "on state" when a voltage is applied. The focal conic state is an intermediate state. In this embodiment, the voltage needed to switch from the homeotropic state to the planar state is about 2-10 volts depending on thickness and the liquid crystal properties. In this embodiment, the thickness of cholesteric liquid crystal composition layer can be about 2 µm to about 10 µm in that part of the lens 30 where switching is desired.

It should be noted that the embodiment of the homeotropic off state can be repeated for, and can be applicable to, the other configurations.

In the embodiments of this invention the lens (e.g., the LC lens 30) can have a thickness at the center in a range of about 10 µm to about 100 µm, and tapering in thickness towards the periphery of the lens where the thickness can be, for example, about 50% or less than the center thickness. In the embodiments of this invention the cholesteric liquid crystal composition can be switched to a gray scale, intermediate state, for continuous focal length variation. The change of the liquid crystal directors depends on the strength of the electric field. The thinner the cell gap, the higher the electric field strength for a given switching voltage, the greater change of the liquid crystal director, thus the greater is the change in the effective index of refraction.

There can be a number of variations of the LC mode. A first LC mode variation concerns the bistable (multi-stable) polymer-stabilized cholesteric LC, i.e., a cholesteric LC material in a polymer network. A homogeneous alignment can be achieved so that the planar state (FIG. 3A) is the default state. This can be accomplished by applying a voltage to switch the LC into the homeotropic state (FIG. 3B), then curing the polymer network with a field to establish an anisotropic polymer network that stabilizes the homeotropic state.

Another variation is the homogenous alignment case where the 0 state is the planar state (FIG. 3A) and the 1 state is the homeotropic state (FIG. 3B). This can be accomplished by the use of rubbing or by photo alignment or ion beam alignment.

The use of rubbing is a well-known technique. This can be achieved by coating surfaces of the cell with a thin, transparent film of polyimide (long chain-like molecules). When the polyimide film layer is rubbed by a cloth, e.g., a velvet cloth, microscopic groves are produced in surface of the polyimide layer and the molecule chains line up in the rubbing direction. This guides the liquid crystal molecules at the surface into the same orientation. The result can be a twisted or helical structure of the liquid crystal molecules which try to align parallel to each other.

Photo alignment and ion beam alignment are two representative non-contact alignment methods that utilize UV light or an ion beam to create asymmetry on the alignment surface to force the liquid crystal modules to align in certain direction.

Another variation of the LC mode is the homogenous alignment where the directors are random in-plane. In this case the 0 state is the planar state (FIG. 3A) and the 1 state is the homeotropic state (FIG. 3B). This can be accomplished without requiring rubbing for alignment, but instead using a homogenous polyimide. This can provide at low cost a curved surface with a lamination and roll-to-roll process.

Another variation is the homeotropic alignment where the 0 state is the homeotropic state (FIG. 3B) or the focal conic state (FIG. 3C), and where the 1 state is the planar state (FIG. 3A). This can also be accomplished without requiring rubbing for alignment, and can also provide at low cost a curved surface by a lamination and roll-to-roll process.

It can be noted that all of the foregoing examples of LC mode variations can be polymer stabilized. This can involve the use of an embedded anisotropic polymer network, wherein the embedded anisotropic polymer network stabilizes a molecular orientation of the cholesteric liquid crystal material.

In addition to the foregoing LC modes there is a nematic liquid crystal mode that can provide both homogenous and homeotropic modes with TN (twisted nematic), STN (super-twisted nematic), and ECB (electrically controlled birefringence) modes. These can be realized as single layer and orthogonal double layer embodiments for polarization independence.

There are numerous potential applications for the variable focal length LC lens in accordance with embodiments of this invention. One such application is for a low power and thin adjustable lens for camera zoom or focus applications (e.g., smart phones, security cameras). Another application is for a visual aide such as a variable focus adjustable contact lens or adjustable glasses. Another application is for a visual aide such as sun glasses or contact lens. Another application is for a UV blocker, an IR blocker, or a changeable color contact lens. Another application is for a personalized visual aid for smart phones, hand held devices, and computer screens, such as a switchable magnifier film, that is tuned to user's eye sight. These several potential applications are merely examples, and are not to be viewed as an exhaustive list of potential applications for the embodiments of this invention.

Further, one or more liquid crystal lens can be stacked or spaced to create an even greater focal length or combination of benefits/attributes such as UV blocking and focal length adjustment. For example, there can be a stack of left handed and right handed cholesteric liquid crystals that reflect in the UV range so as to block harmful UV light and that serve as a tunable prescription goggle. Further by example, there can be a stack of liquid crystal layers with different pitches to form band gap filters (e.g., a band filter to enhance night vision and being switchable between night vision and normal vision).

The embodiments of this invention provide in one aspect thereof for a variable liquid crystal lens thickness and voltage controlled focal adjustment. This can be achieved for less than 20V to 30V for a thicker lens and less than 2V to 10V for a thinner lens.

Figure 4:
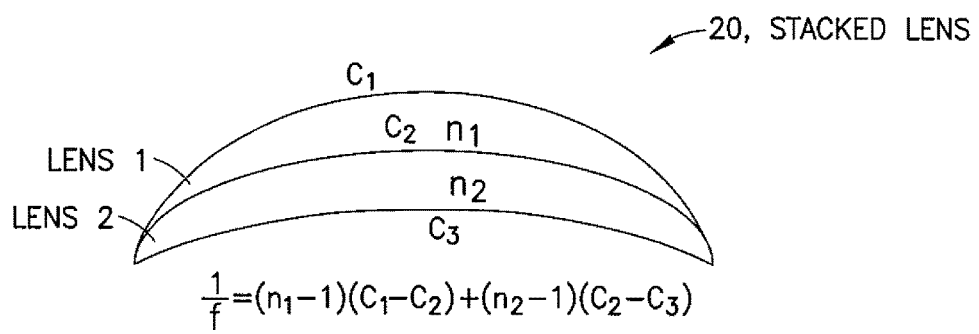
FIG. 4 illustrates an enlarged cross-section view of a multiple lens stack.

Reference is made to FIG. 4 for showing a multiple lens stack 20 (having two stacked lens elements, Lens 1 and Lens 2, in this non-limiting embodiment) to increase the focal length tunable range and tunable setting. For the example of the two stack lens 20 there are four default states, plus intermediate states:

$n_1 = n_{1,o}$, $n_2 = n_{2,o}$  $1/f = (n_{1,o}-1)(C_1-C_2) + (n_{2,o}-1)(C_2-C_3)$
$n_1 = n_{1,o}$, $n_2 = n_{2,e}$  $1/f = (n_{1,o}-1)(C_1-C_2) + (n_{2,e}-1)(C_2-C_3)$
$n_1 = n_{1,e}$, $n_2 = n_{2,o}$  $1/f = (n_{1,e}-1)(C_1-C_2) + (n_{2,o}-1)(C_2-C_3)$
$n_1 = n_{1,e}$, $n_2 = n_{2,e}$  $1/f = (n_{1,e}-1)(C_1-C_2) + (n_{2,e}-1)(C_2-C_3)$.

In one exemplary embodiment Lens 1 and Lens 2 can have the same pitch, but an opposite twist sense (one is left handed twist, the other is right hand twist). In this case the light of the wavelength is the same as the pitch will be completely reflected. Exemplary applications for this type of multi-lens structure can include band gap filters, such as UV, IR, or color filters, microwave filters, and polarizers.

In another case Lens 1 and Lens 2 can have an orthogonal orientation with respect to each other.

In yet another case the multiple stack of lenses 20 can have different pitches, with either the same or opposite twist senses. An example of an application for this type of multi-element lens stack can include switchable multiple color filters.

These embodiments can be extended to include a stack of two or more of the stacked lens 20 structures, where each has a different pitch. An example of an application for this type of structure includes a multiple band gap filter.

Reference is now made to FIG. 5A (homogeneous case) and FIG. 5B (homeotropic case) that show embodiments of a liquid crystal lens 30 that utilizes a cell gap variation to change the focal length. The volume of the lens 30 enclosed by the top and bottom lens interior surfaces can be considered to represent the volume of the LC cell.

In accordance with embodiments of this invention the LC lens 30 is made thicker at the center of the lens and thinner at the edges of the lens. When a voltage is applied between two substrates (opposing LC electrodes) the electric (E) field is the strongest at the peripheral portion of the lens 30 where the cell is made thinner relative to the center. As is shown in FIGS. 5A and 5B for the On state the orientation change of the LC molecules is larger at the periphery than that at the center. This in turn implies that the change in the index refraction n is larger at the periphery of the lens 30 than at the center of the lens 30, and the effective focal length changes accordingly:

$$\frac{1}{f} = (n-1)(C_1 - C_2).$$

In effect the value of the index of refraction is made to vary across the lens 30 from the center of the lens 30 towards the outer edges of the lens 30.

There are several advantages that can be realized by the use of the variable cell thickness LC lens 30. For example, a lower driving voltage can be used since there is no need to switch the thick central portion of the lens. Further, in the lens 30 a continuous focal length adjustment can be realized. Also, in the lens 30 the curvature profile plus the LC director profile can work together to yield the overall lens properties.

In one embodiment of the lens 30 shown in FIGS. 5A and 5B, as well as the other illustrated embodiments, the cell that contains the LC material can be defined by layers that comprise a soft polymer material including but not limited to, a hydrogel, a silicone based hydrogel, a polyacrlyamide, or a hydrophilic polymer. In other embodiments, substrate layers may comprise polyethylene terephthalate ("PET"), polymethyl methacrylate ("PMMA"), polyhydmxyethyl-methacrylate (polyHEMA) based hydrogels, or combinations thereof. In yet another embodiment the substrate layers may comprise a rigid gas permeable material. In yet another embodiment the substrate layers may comprise glass, plastic (such as a polycarbonate), or any other suitable material. In one embodiment the cell can be made entirely of one of the foregoing materials or, in other embodiments, two or more difference materials may be used (e.g., the bottom surface of the cell is one material and the top surface is made from another material). At least one of the substrate layers has a curved shape.

Figure 6:
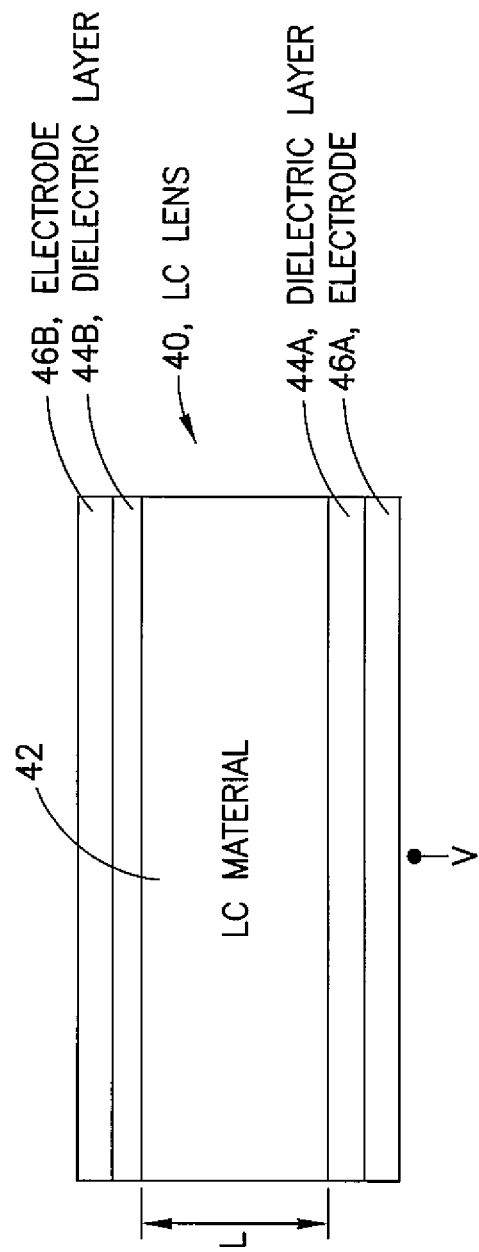
FIG. 6 illustrates a uniform cell gap LC lens wherein a liquid crystal director profile establishes the lens characteristics.

Referring to FIG. 6, the embodiments of this invention also pertain in part to a uniform cell gap LC lens 40, wherein a profile of the LC director establishes the lens characteristics. LC director profile engineering can be used to establish the variable lens focal length. In one embodiment a dielectric layer 44A can be sandwiched between an electrode 46A and the liquid crystal material 42, where the dielectric layer 44A has a radial gradient of dielectric constant profile so that voltage applied on the liquid crystal material 42 is:

$$V_{lc}(r) = V \frac{\varepsilon_d(r)}{\varepsilon_{Lc}(r)} \frac{L_{lc}}{L_d},$$

where the subscript lc denotes the liquid crystal layer 42, the subscript d denotes the dielectric layer 44, ε is the dielectric constant, L is the thickness of the cell containing the liquid crystal material 42 and V is the applied voltage.

In this embodiment it can be seen that a second opposing dielectric layer 44B may be used. This embodiment also shows the second opposing transparent conducting electrode 46B that cooperates with the first transparent conducting electrode 46A to establish an electric field across the LC material 42. It is pointed out that in other drawing figures where electrodes are shown (e.g., 7, 8, 9 and 10) that an opposing electrode can be present. In this embodiment, the dielectric layer of variable dielectric constant 44A and/or 44B can be comprised of liquid crystal polymer with variable liquid crystal director profiles. Also in this embodiment the transparent conducting electrodes 46A and/or 46B can be comprised of one or more segments.

In another embodiment the LC director profile engineering can use resistive electrodes that produce a voltage drop in a radial format, resulting in a radial voltage profile on the liquid crystal material 42.

In another embodiment the LC director profile engineering can use electrodes that are configured with one or more protrusions, or holes, or slots that can produce a radial E field profile.

In another embodiment the LC director profile engineering can use pixelated electrodes that are formatted in, for example, rings, ellipses, parabolas, rectangles and combinations of these and other geometric formats. The pixels can be individually addressed to create the liquid crystal profile for the desired optical output. For example, the liquid crustal profile can be one to correct vision such as myopia, hyperopia, presbyopia, and astigmatism. The lens can be programmable to accommodate the needs of a vision change over time.

It is pointed out that the foregoing discussion of the LC director profile engineering applies equally to the variable thickness cell gap embodiments shown in FIGS. 5A and 5B as well as the other figures.

Figure 7B:
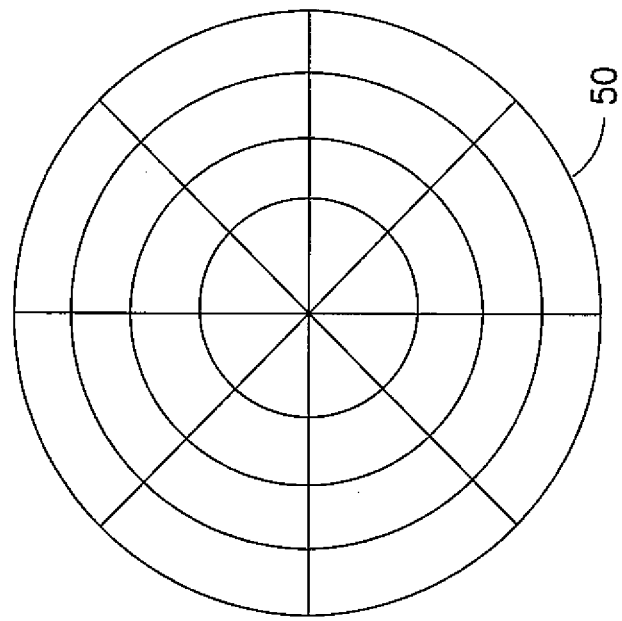
FIG. 7A and FIG. 7B, collectively referred to as FIG. 7, illustrate non-limiting examples of pixelated electrodes that can be used with any of the LC cell embodiments of FIGS. 1-6.
Figure 7A:
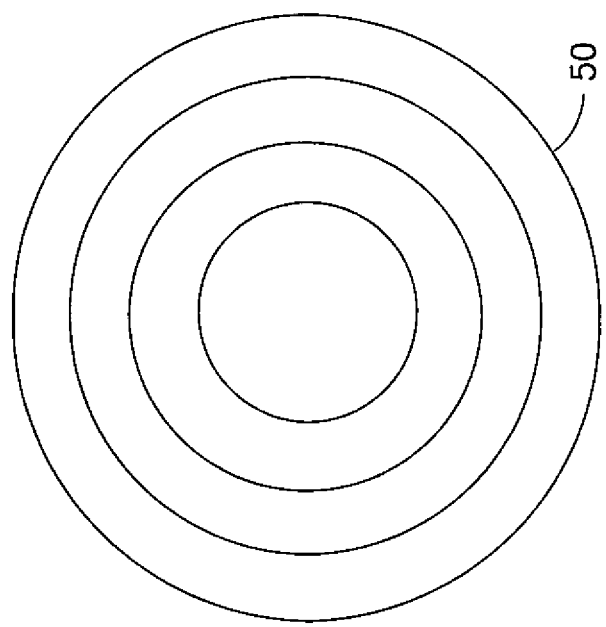

Non-limiting examples of pixelated electrodes 50 are shown in FIG. 7A (concentric rings, e.g., circular or elliptical) and 7B (concentric arcs with i segments). Rectangular and parabolic shapes can also be used.

Figure 8B:
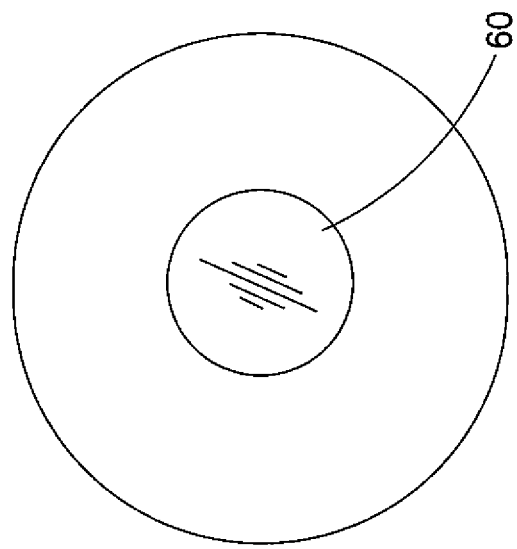
FIG. 8A and FIG. 8B, collectively referred to as FIG. 8, illustrate non-limiting examples of electrode geometries to achieve electric field shaping by the use of electrode gaps or holes.
Figure 8A:
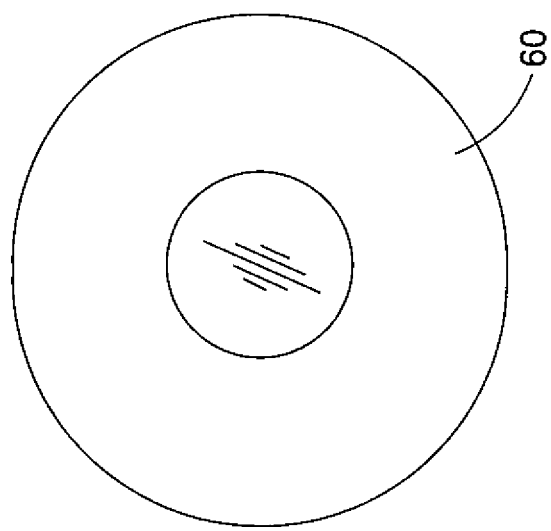

Non-limiting examples of the E field shaping by the use of an electrode with gaps or holes are shown in FIG. 8A (center hole in a transparent conducting electrode 60, e.g., a layer of indium-tin-oxide (ITO)) and 8B (center transparent conducting electrode 60). Other possible shapes than the illustrated circular shapes include ellipses, rectangles and parabolic shapes.

As was noted above in one embodiment the transparent conducting electrode 60 can be a layer comprised of ITO, however those skilled in the art will understand that other transparent conducting oxides can be used, such as indium zinc oxide (IZO), Al-doped zinc oxide (AZO), Ga-doped zinc oxide (GZO), or indium gallium zinc oxide (IGZO) as non-limiting examples. In other embodiments, any combination of ITO, IZO, AZO, GZO, and IGZO can be used. In other embodiments conducting material such as carbon nano tubes (CNT), graphene and graphene oxide can be used. In another embodiment, transparent conducting electrode layers may comprise a conducting polymer or any other transparent conductive material. In one embodiment, transparent conducting electrode layers can have a thickness in the range of about 20 angstroms to about 1000 angstroms. Transparent conducting electrode layers can be located on the inner surfaces of cell to allow for a shorter distance between two electrode layers and therefore a smaller switching voltage is needed (e.g., less than 20 volts, preferably less than 10 volts). In other embodiments the transparent conducting electrode layers can be located on the outer surfaces of the cell.

Figure 9A:
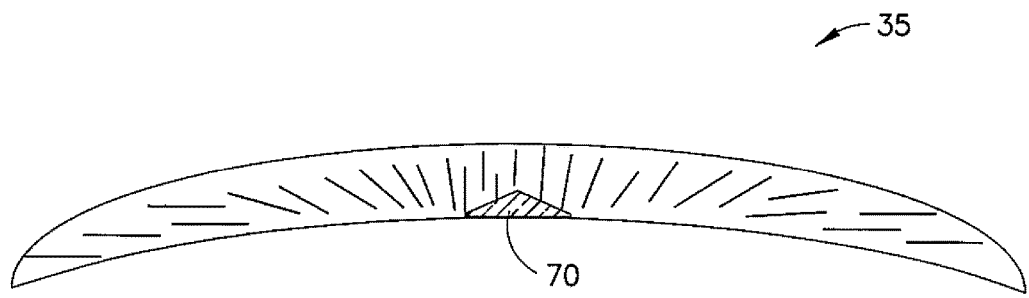
FIG. 9A is a cross-sectional enlarged side view and FIG. 9B is a top view of another embodiment of a LC lens that is made thicker at the center of the lens and thinner at the edges of the lens, where at the center of the lens there is a protruding transparent conducting electrode that aids in shaping the effective index of refraction profile of the LC lens.
Figure 9B:
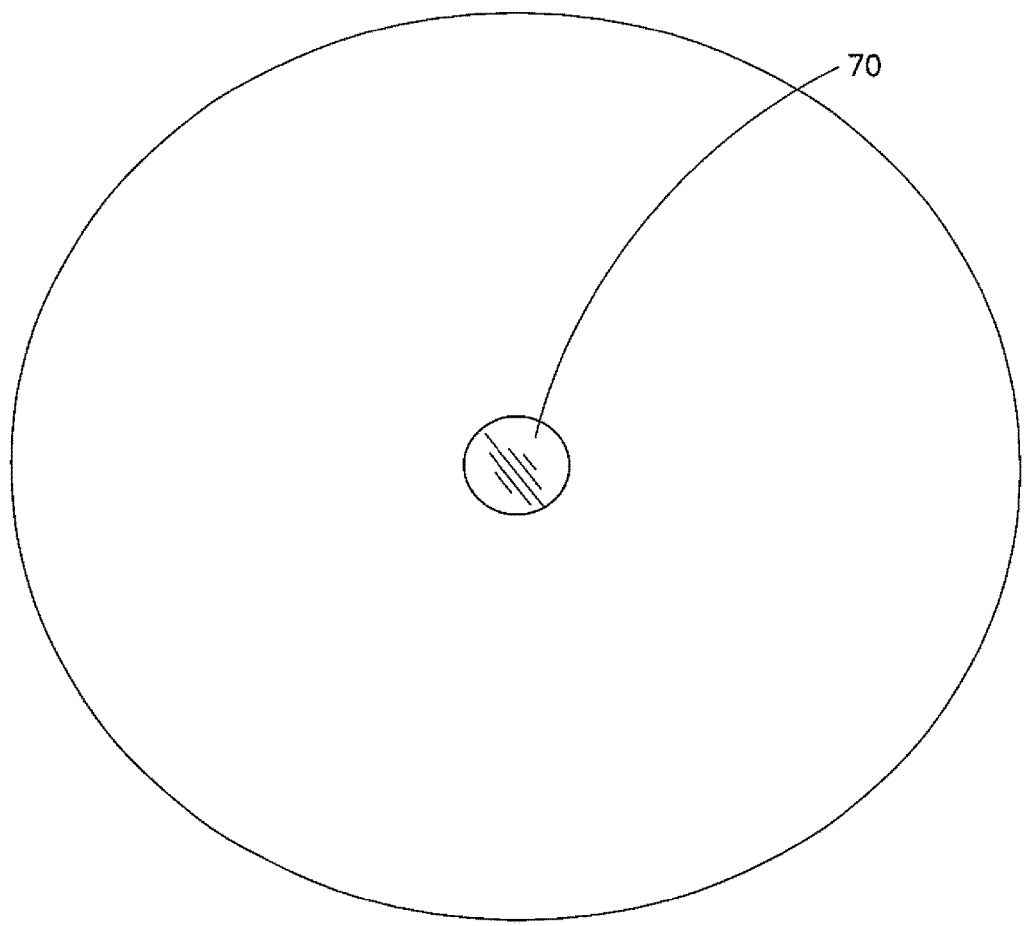

FIG. 9A is a side cross-sectional enlarged view and FIG. 9B is a top view of another embodiment of a LC lens 35 that is made thicker at the center of the lens and thinner at the edges of the lens. In this embodiment at the center of the lens 35 there is a protruding (into the cell) transparent conducting electrode 70. The protruding electrode 70 aids in shaping the effective index of refraction profile of the LC lens 35. As in the other embodiments other shapes than the illustrated circular shape of the electrode 70 can include elliptical, rectangular and parabolic shapes.

Figure 10A:
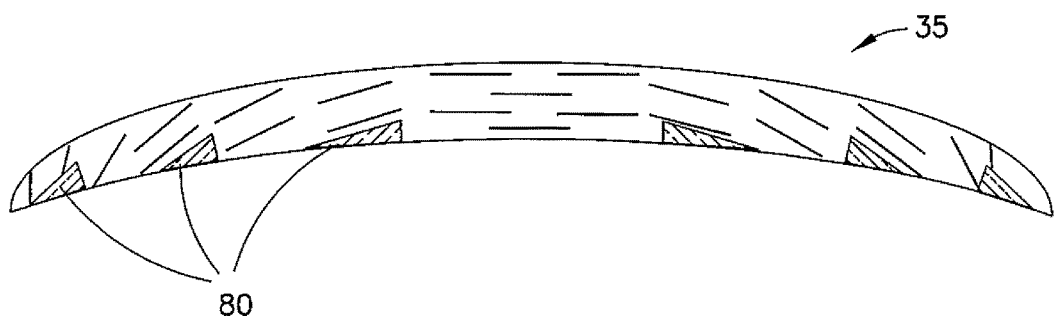
FIG. 10A is a cross-sectional enlarged side view and FIG. 10B is a top view of another embodiment of a LC lens that is made thicker at the center of the lens and thinner at the edges of the lens, where the transparent conducting electrode is arranged as multiple protruding concentric electrodes about the center of the lens to aid in shaping the effective index of refraction profile.
Figure 10B:
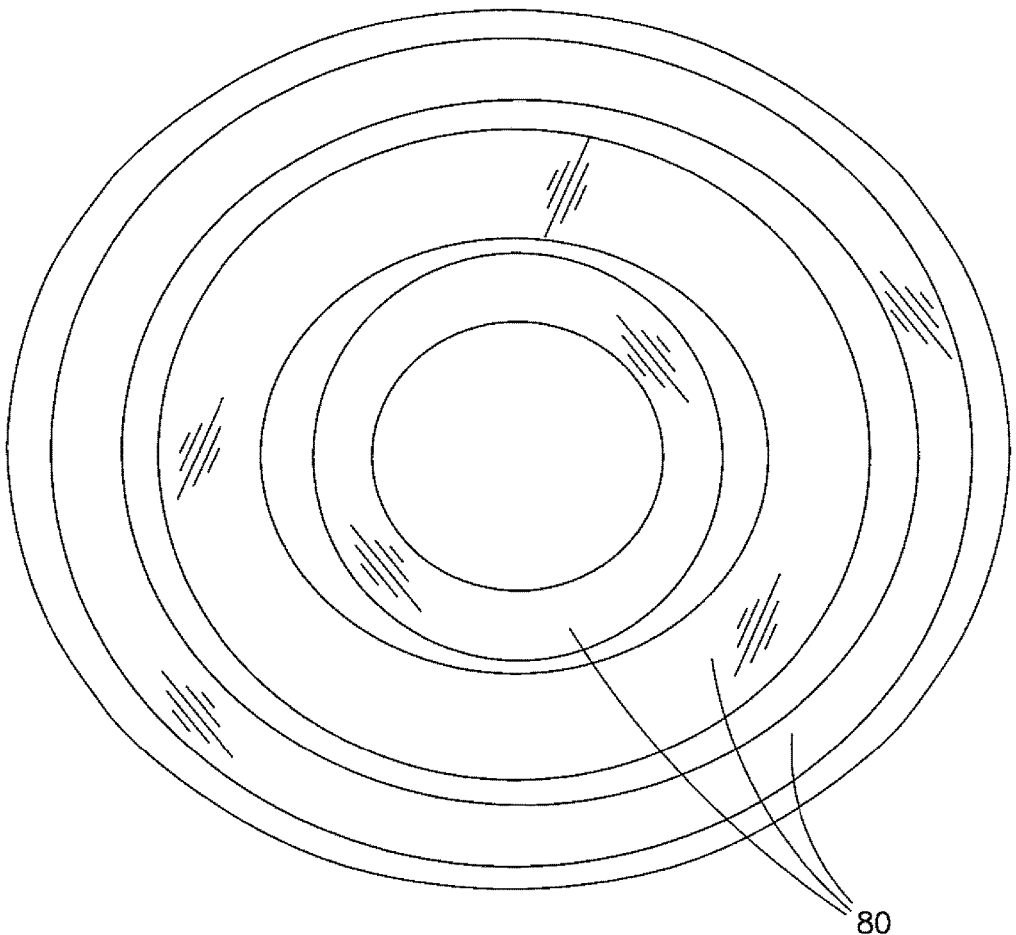

FIG. 10A is a side cross-sectional enlarged view and FIG. 10B is a top view of another embodiment of the LC lens 35 that is made thicker at the center of the lens and thinner at the edges of the lens. In this embodiment some plurality of transparent conducting electrodes 80, e.g., three electrodes of differing diameters as shown, are arranged around the center of the lens 35 and protrude at least partially into the cell. The protruding electrodes 80 can exhibit a saw tooth appearance as shown and can extend into the cell by differing amounts. In the illustrated example the protruding electrodes 80 nearest the edge of the cell (i.e., furthest from the center of the cell) extend further into the cell that those electrodes 80 that are nearer to the center. This arrangement aids in maximizing the electric field strength at the periphery of the cell relative to the center of the cell. The cross section shape of the protruding electrodes can be triangular, rectangular, trapezoidal, a semicircle and other 2D shapes. The ring protruding elements may be continuous or may have one or more gaps. The conductive coating on the protruding elements may be continuous or may have one or more gaps. In this embodiment each of the electrodes 80 can be connected to the same voltage potential. In another embodiment each of the electrodes 80 could be connected to a different voltage potential. The electrode geometry aids in shaping the effective index of refraction profile of the LC lens 35. As in the other embodiments other shapes than the illustrated circular shape of the electrode 80 can include elliptical, rectangular and parabolic shapes.

The substrate of an LC lens may be a transparent material such as polycarbonate, glass and hydrogel. The LC may be filled by a vacuum fill method or by a one drop fill method. For the vacuum fill method the peripheral portion of the LC cell can be sealed by adhesive or welding except for a fill port. The cell is evacuated and a selected liquid crystal material is dispensed onto the port in vacuum. Once the cell is filled with liquid crystal the port is sealed. For the one drop fill method a precise amount of liquid crystal material is dispensed on the LC lens area on a first substrate, and the sealant is dispensed on the peripheral portion of the lens area. A second substrate is placed on the first substrate and the sealant is then cured. The substrate assembly with the liquid crystal may also be sealed by a welding process, e.g., an ultrasonic welding process.

One non-limiting aspect of this invention thus can be seen to provide transparent conducting electrodes arranged in a pattern that comprises one or more of concentric rings, concentric annuli and concentric arcs.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples the use of other electrode shapes, liquid crystal materials, cell dimensions and the like may be attempted by those skilled in the art. However, all such and similar modifications of the teachings of this invention will still fall within the scope of this invention.

What is claimed is:

1. A lens structure comprising:
a transparent cell containing a liquid crystal material, the cell having opposing top and bottom surfaces and being thicker in a center region thereof than at peripheral regions; and
transparent electrically conductive electrodes coupled with preselected regions of the opposing top and bottom surfaces of the cell, said preselected regions being of smaller total area than said opposing top and bottom surfaces, said transparent electrically conductive electrodes being configured to establish an electric field through the cell, said electric field being strongest at the peripheral regions where the cell is thinner relative to the center region, so that a value of the index of refraction of the liquid crystal material changes across the cell from the center region towards the peripheral regions to change an effective focal length of the lens structure.

2. The lens structure as in claim 1, wherein the top surface of the cell has a first curvature $C_1$ and wherein the bottom surface of the cell has a second curvature $C_2$ differing from the first curvature $C_1$.

3. The lens structure as in claim 2, wherein the lens structure is a first lens structure, and further comprising at least one second lens structure disposed on the first lens structure, said at least one second lens structure having a transparent cell containing a liquid crystal material, wherein top and bottom surfaces of the cell of the second lens structure have the same or different curvatures as $C_1$ and $C_2$, and wherein the liquid crystal material contained in a cell of the second lens structure is the same or different from the liquid crystal material contained in the cell of the first lens structure.

4. The lens structure as in claim 1, wherein the transparent electrically conductive electrodes each include a layer of transparent electrically conductive material disposed in a pattern predetermined to cause the value of the index of refraction of the liquid crystal material to change across the cell from the center region towards the peripheral regions.

5. The lens structure as in claim 4, wherein the pattern includes one or more of concentric rings, concentric annuli and concentric arcs.

6. The lens structure as in claim 4, wherein the pattern includes an electrode protruding partially into the cell in a least one location.

7. The lens structure as in claim 6, wherein the at least one location is a plurality of locations disposed concentrically around the center of the cell.

8. The lens structure as in claim 1, wherein the liquid crystal material includes a nematic liquid crystal material.

9. The lens structure as in claim 1, wherein the liquid crystal material includes a cholesteric liquid crystal material.

10. The lens structure as in claim 9, wherein the liquid crystal material further comprises an embedded anisotropic polymer network configured to stabilize a molecular orientation of the cholesteric liquid crystal material.

11. The lens structure as in claim 1, wherein the liquid crystal material includes a chiral compound mixed with a nematic liquid crystal compound.

12. The lens structure as in claim 1, wherein, prior to application of a voltage potential to the transparent electrically conductive electrodes, the liquid crystal material exhibits one of a planar cholesteric liquid crystal mode, a homeotropic cholesteric liquid crystal mode and a focal conic cholesteric liquid crystal mode.

13. The lens structure as in claim 1, whew wherein the central region has a thickness in a range from about 10 μm to about 100 μm and tapers in thickness towards the peripheral regions where the thickness is about 50% or less than the central region thickness.

14. The lens structure as in claim 1, wherein the transparent electrically conductive electrodes each include a layer of transparent electrically conductive material disposed in a pattern predetermined to establish, in response to application of a voltage potential to the transparent electrically conductive electrodes, the electric field only in the peripheral regions of the cell to cause the liquid crystal material in the peripheral regions of the cell to exhibit one of a planar cholesteric liquid crystal mode, a homeotropic cholesteric liquid crystal mode and a focal conic cholesteric liquid crystal mode.

* * * * *